United States Patent [19]

Morrison et al.

[11] 4,306,541

[45] Dec. 22, 1981

[54] SOLAR ENERGY POWERED SUN TRACKING DEVICE

[75] Inventors: Clayton Morrison; Norman Cope, both of Gainesville, Fla.

[73] Assignee: University of Florida, Gainesville, Fla.

[21] Appl. No.: 52,500

[22] Filed: Jun. 27, 1979

[51] Int. Cl.³ .............................................. F24J 3/02
[52] U.S. Cl. ................................. 126/425; 73/368.4; 126/438; 353/3
[58] Field of Search ...................... 126/424, 425, 438; 250/203 R; 353/3; 73/339 C, 368.3, 368.4, 362.8

[56] References Cited

U.S. PATENT DOCUMENTS

| 1,913,920 | 6/1933 | Durnin | 73/368.3 X |
| 4,027,651 | 6/1977 | Robbins, Jr. | 126/425 |
| 4,089,323 | 5/1978 | Trihey | 126/925 |
| 4,158,356 | 6/1979 | Wininger | 126/438 |
| 4,159,710 | 7/1979 | Prasy | 126/425 X |
| 4,173,894 | 11/1979 | Gerike | 73/362.8 |
| 4,185,615 | 1/1980 | Bottum | 126/424 |
| 4,198,954 | 4/1980 | Meijer | 126/425 |

FOREIGN PATENT DOCUMENTS 1493 4/1979 European Pat. Off. ............ 126/425

OTHER PUBLICATIONS

C. A. Morrison et al., "Solar Powered Tracking Device", *Building Systems Design*, Dec./Jan. 1976, pp. 7-9.
David B. Wiggins, "Design and Development of a Solar Powered Heliotropic Fluid-Mechanical Drive System", Thesis, *University of Florida, 1975*.

*Primary Examiner*—Albert J. Makay
*Assistant Examiner*—Harold Joyce
*Attorney, Agent, or Firm*—Arthur G. Yeager

[57] ABSTRACT

A solar powered tracking device for controlling radiation exposure of surfaces, wherein solar radiation increases the vapor pressure of a liquid in a sensing device and the vapor pressure acts on opposed pneumatic cylinders to produce mechanical movement of the controlled surface to track the sun with a maximum deviation of not more than 0.5° under normal clear sky radiation conditions.

12 Claims, 11 Drawing Figures

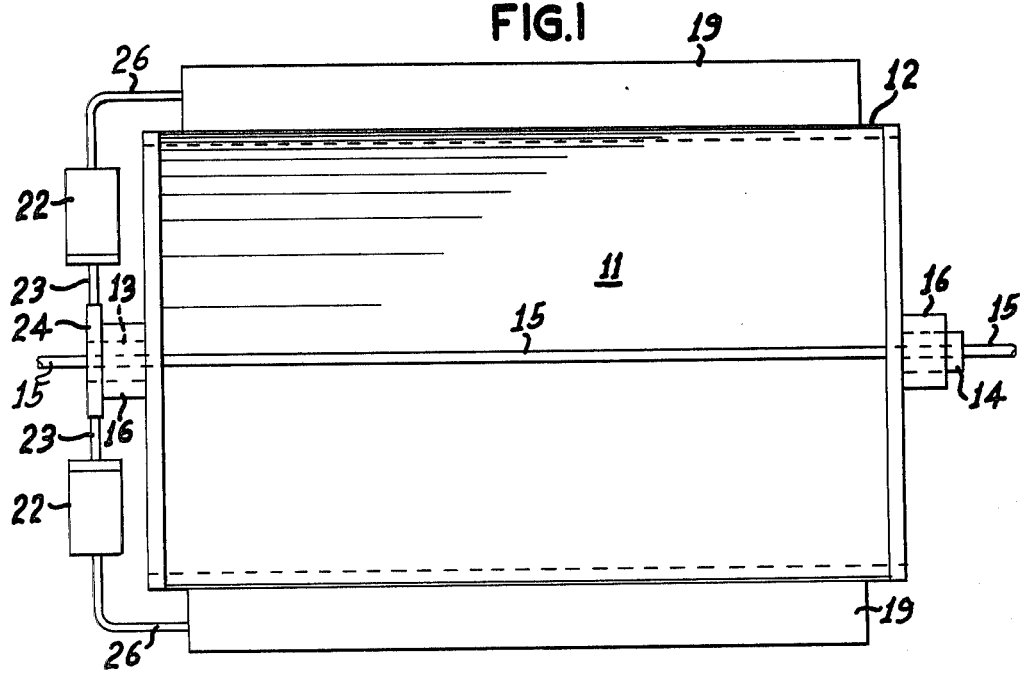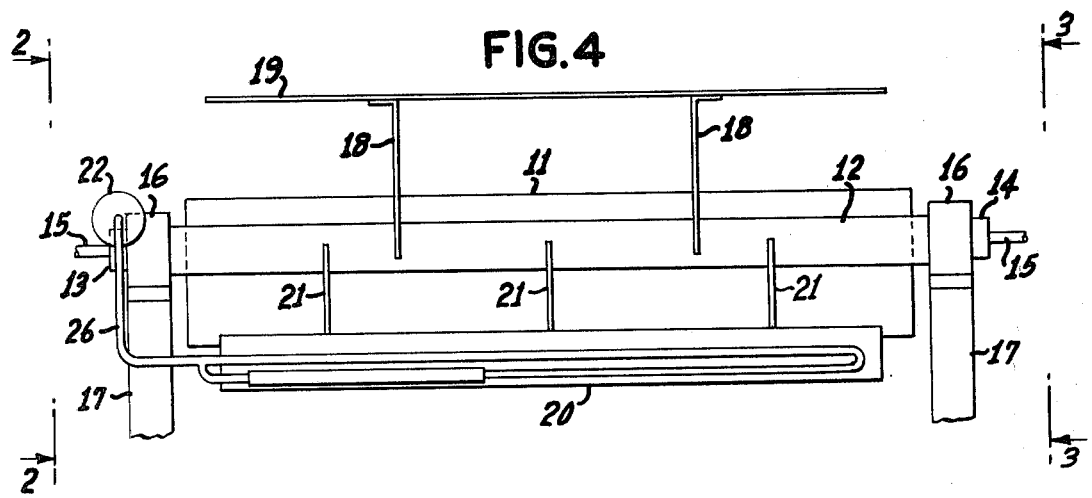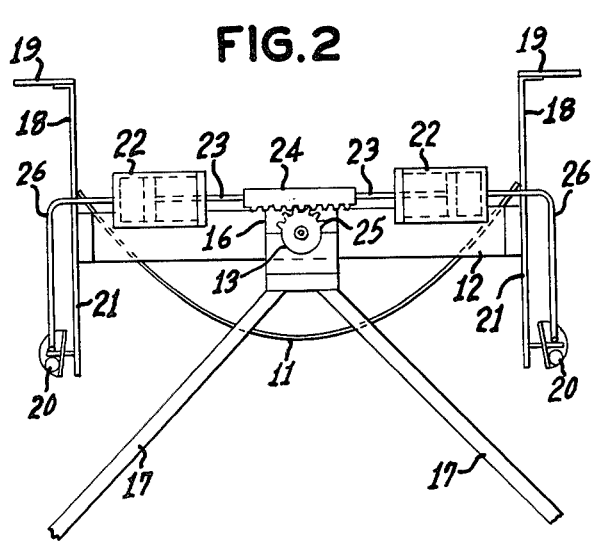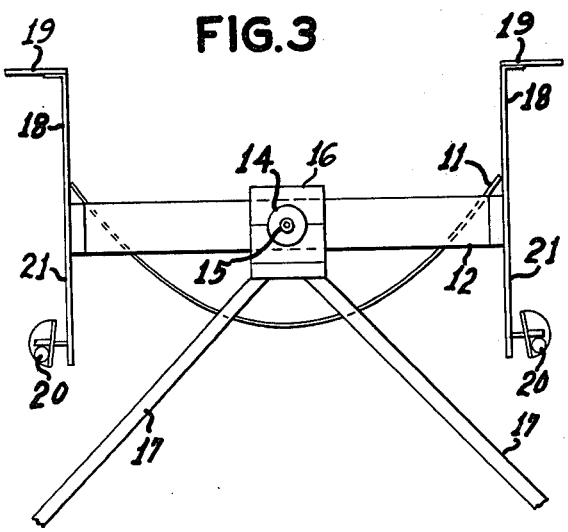

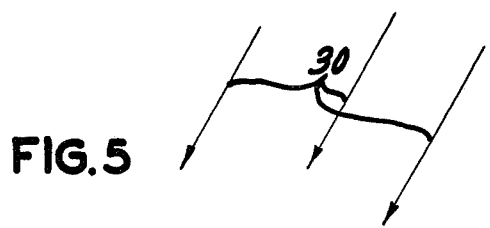
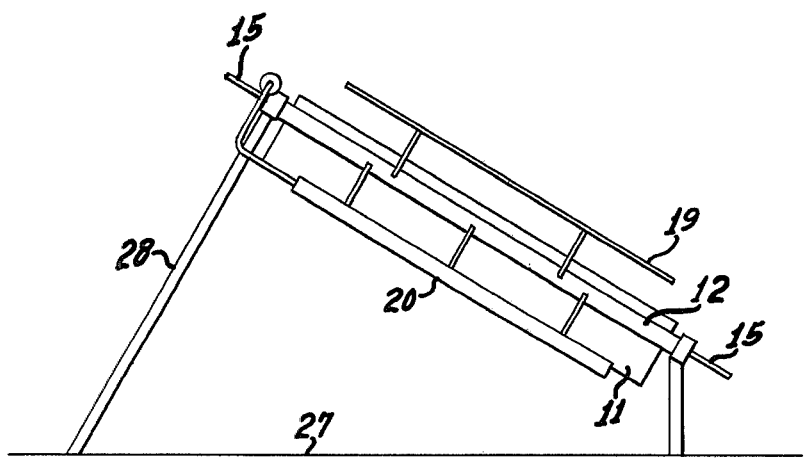
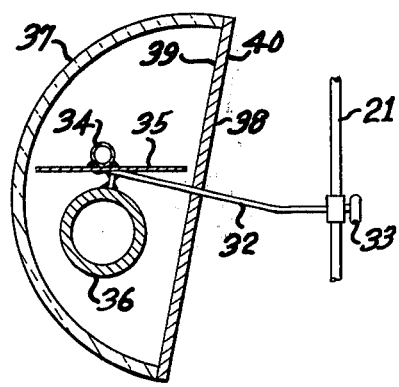
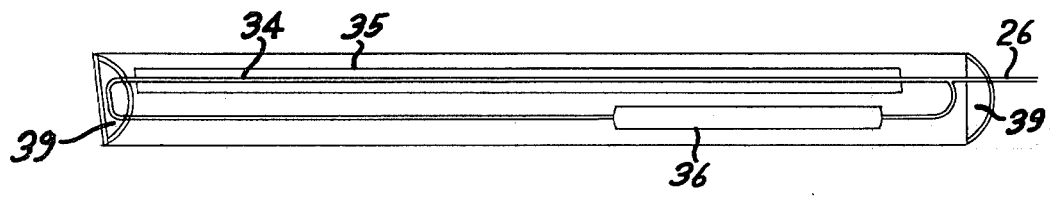

SOLAR ENERGY POWERED SUN TRACKING DEVICE

The U.S. Government has rights in this invention pursuant to a fellowship awarded the National Science Foundation.

BACKGROUND OF THE INVENTION

This invention relates to an improvement in a solar powered tracking device which is then used to drive a concentrating solar collector for concentrating solar radiation, and more particularly, it relates to such a device wherein the radiation received by sensing devices containing a volatile liquid results in a vapor pressure which powers the movement of the device to respond appropriately when subjected to solar radiation of the sun.

The technology of utilizing solar energy is not new. It has been known for many years that solar radiation may be concentrated with mirrors and with lenses to produce temperatures of 1000° F. and higher. Tracking devices in the past have been powered by electric motors, clockwork mechanisms, hydraulic cylinders, and even locomotive engines. Clockwork mechanisms are precise but they frequently are limited as to the maximum size of the control surface that can be turned. Electric motor systems are probably the most common devices in this field but these systems can be costly and complex. The use of hydraulic or pneumatic pistons and cylinders is much less expensive if a self-contained driving system can be developed that does not rely upon electricity, fuel oil, or other purchased energy sources. Among the prior art patents in this field in U.S. Pat. No. 4,027,651 to Robbins in which a V-shaped receiver is fitted with mirrors and shading devices that direct the solar radiation or, conversely, shield the solar radiation from tubing coils containing a heat sensitive fluid which produces a differential pressure on a piston that in turn causes the apparatus to be adjusted so that it points directly at the sun. In U.S. Pat. No. 4,038,972 to Orrison a parabolic mirror concentrates the solar radiation and tracks the sun by an automatic control based on a light sensing apparatus which signals an electric motor to turn the mirror in whatever direction is needed. In U.S. Pat. No. 4,078,549 to McKeen et al., a mirror facing the sun concentrates the solar radiation and is kept in the appropriate position by a light-sensing mechanism which controls an electric motor that moves the mirror by a chain drive.

The present invention is an improvement on the device described in an article by Morrison et al., entitled "Solar Powered Tracking Device", Building Systems Design, Dec./Jan. 1976. The device described in this article comprises a mirror which is parabolic in cross section and has any suitable and convenient length along which at the focus of the parabola is a metallic tube receiving the concentration of radiation striking the mirror and through which flows any suitable fluid which can receive the solar energy. The device is powered to track the sun by means of two hydraulic/pneumatic cylinders whose pistons are fixed to each other in an opposing relationship. The piston rods are joined to each other through a gear rack which is mated to a pinion gear affixed to the axis of rotation of the mirror such that any movement of the gear rack and pinion gear will cause the control surface to rotate about its axis. The two cylinders are powered with the vapor pressure from a refrigerant liquid which forms the working portion of two radiation sensing bulbs containing the liquid and attached to each side of the movable control surface. Appropriate shading devices are located to shade or not to shade the sensing devices from solar radiation when the control surface is not pointed directly at the sun. Only one of the two sensing devices is more exposed to the sun in any given position of the control surface except when it is pointed directly at the sun, in which event both of the sensing devices are partially shaded from radiation. When the control surface is not pointed directly at the sun the more exposed sensing device is heated by the solar radiation to cause an increase in vapor pressure of the refrigerant liquid which in turn causes a corresponding movement of the pistons in the cylinders, and through the gearing arrangement a corresponding movement of the control surface. While this device has many admirable features it does not track the sun with sufficient precision to be acceptable as a practical means for concentrating solar energy.

SUMMARY OF THE INVENTION

This invention priovides improvements in the basic device described in the Farber article mentioned above. The improvement lies in the radiation sensing device which functions to cause the control surface to be repositioned with respect to the sun with considerable precision. The device of this invention is capable of maintaining the controlled surface at a position which is not more than 0.5° away from alignment with the sun under normal clear sky radiation conditions. The improvements involve a radiation sensing element which is a light weight metal tubing in the form of a loop which includes a large volume reservoir. The loop is such that liquids or vapor can flow in a closed circuit through the reservoir and the connected tubing. An outlet from the loop leads to the pneumatic cylinders which provide the power for moving the control surface. The loop of tubing and reservoir is constructed such that it extends substantially the length of the sensor element and is joined in a heat conductive manner to a thin, rectangular fin which serves to enhance the heat conductivity of the tube and also to shade the large reservoir from solar radiation. The entire loop of tubing and reservoir is enclosed, except at its end portions, by a tubular shield which permits radiation from one direction and prohibits it from another direction. The tubular shield is transparent to radiation in its portion which faces away from the control surface and is opaque to radiation in its portions which faces toward the control surface. This shield also provides protection against convection due to wind and breezes which would reduce the precision of the device in tracking the sun.

BRIEF SUMMARY OF THE DRAWINGS

FIG. 1 is a plan view of the solar tracking device of this invention.

FIG. 2 is an end elevation view of the device of FIG. 1.

FIG. 3 is the other end elevation view of the device of FIG. 1.

FIG. 4 is a side elevation view of the device of FIG. 1.

FIG. 5 is an illustrative view of the device of this invention in operation.

FIG. 6 is a schematic illustration of the connection between the pneumatic cylinders and the sensing elements of this invention.

FIG. 8 is a schematic end view of the sensing element of this invention and its connection to the tracking device.

FIG. 9 is a perspective view of the sensing element.

DETAILED DESCRIPTION

Figure 7A:
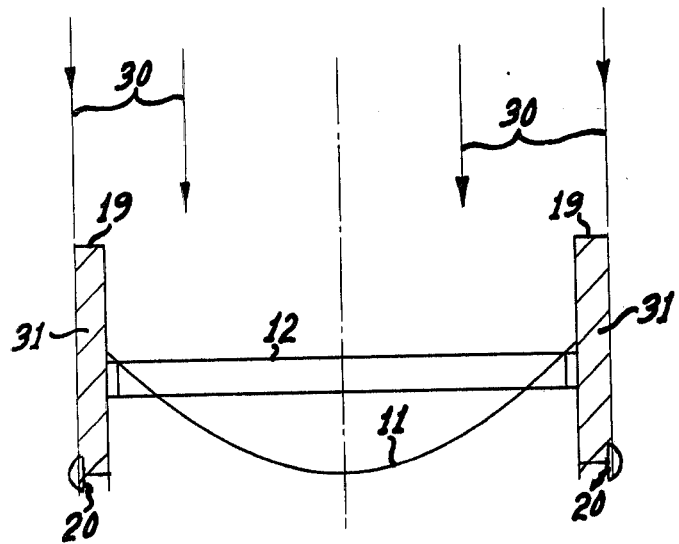
FIG. 7 (A,B,C) are illustrative drawings showing how the sensing elements are activated to track the sun with precision.

With specific reference to FIGS. 1,2,3, and 4 a general understanding of the operation of the solar tracking device can be obtained. Control surface (11) is parabolic in cross section as seen in FIGS. 2 and 3 and extends over a convenient and suitable length as shown in FIGS. 1 and 4. The control surface is supported by rectangular housing (12) having collars (13) (14) attached at each end. Metal tube (15) is supported by the collars and positioned to be along the focus of the parabolic section of the control surface and thus receives the solar radiation striking the control surface and subsequently being reflected to the focus of the parabola. Any suitable energy absorbing fluid may be circulated through tubing (15), such as water, oil, molten salt, etc. Control surface (11), housing (12) and collars (13) and (14) are all fixed to each other and are rotated around the axis of tubing (15) although the tubing does not turn with the other parts but merely fits loosely through collars (13) and (14) resting in bearings (16) fixed to a supporting structure of legs (17) at each end of the device. The legs are adjustable in length so that the entire device can be positioned as closely as possible perpendicular to the rays of the sun. This position will vary depending upon the seasons of the year. Attached to each of the long sides of housing (12) are brackets (18) to which are attached sun shades (19). Radiation sensor (20) is supported on each side of housing (12) below sun shade (19) and is supported by an appropriate number of arms (21) attached to housing (12). The relative positioning of sensors (20) and sun shades (19) as well as the sizes of the two elements depends upon the tracking sensitivity which the operator desires for this device and the details of this will be explained later.

At the end of the device which operates at the highest elevation, as seen in FIG. 5, hereinafter referred to as the "head" of the device, there is located the mechanism which turns control surface (11) in its movement in tracking the sun. Two pneumatic cylinders (22) are assembled in an opposing relationship by joining the piston connecting rods (23) to each other through a rack gear (24). Rack gear (24) mates with stationary pinion gear (25) which is fixed to bearing (16). As the pistons in cylinders (22) move to the right or left that movement is transmitted to rack gear (24) and pinion gear (25) to cause control surface (11) and the equipment attached thereto to turn. Each of sensors (20) is connected by tubing (26) to its appropriate cylinder (22) so that pneumatic pressure generated by the fluid in one of the sensors (20) will oppose the pressure generated in the other sensor (22). The connection between tubing (26) and cylinders (22) will be discussed in detail in the description of FIG. 6.

In FIG. 5 there is illustrated a general view of the assembly, upon which is mounted the device of this invention, resting on the ground or any other support parallel to the ground indicated at (27) and receiving radiation (30) from the sun. Due to the fact that the north-south axis of the earth rotates in a conical fashion as the earth orbits the sun, the angle at which the sun's rays hit the earth surface varies throughout the year from a smaller angle in the winter season to a larger angle in the summer season. In order to utilize the maximum of the sun radiation which strikes control surface (11) the focal axis of the control surface, represented by the axis of tubing (15) should be perpendicular to the rays from the sun.

In FIG. 6 there is a schematic illustration of the connections between the sensors (20) and pneumatic cylinders (22). The tubing (26) coming from one of sensors (20) leads into one of the two cylinders (22) and the tubing (26) from the other sensor (20) leads into the other cylinder (22) to produce opposing forces on the pistons (29). The tubing (26L)) from sensor (20L) leads to the left hand portion of cylinder (22L) and tubing (26R) from sensor (20R) leads to the right hand portion of cylinder (22R). In this way pressure from sensor (20R) pushes both of pistons (29) to the left, and pressure from the sensor (20L) pushes both of pistons (29) to the right. Whatever the balance of forces on pistons (29L) and (29R) may be, the resultant force moves piston rods (23) and rack gear (24), which translates itself into a movement of control surface (11) and its attached equipment.

Figure 7B:
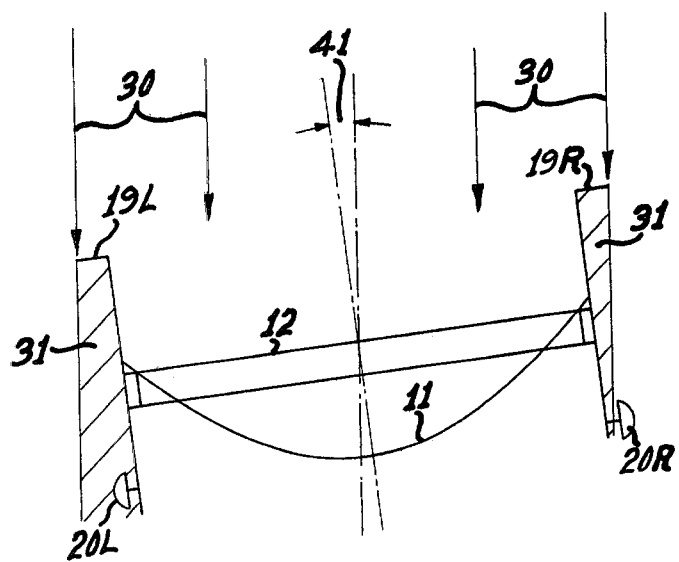
Figure 7C:
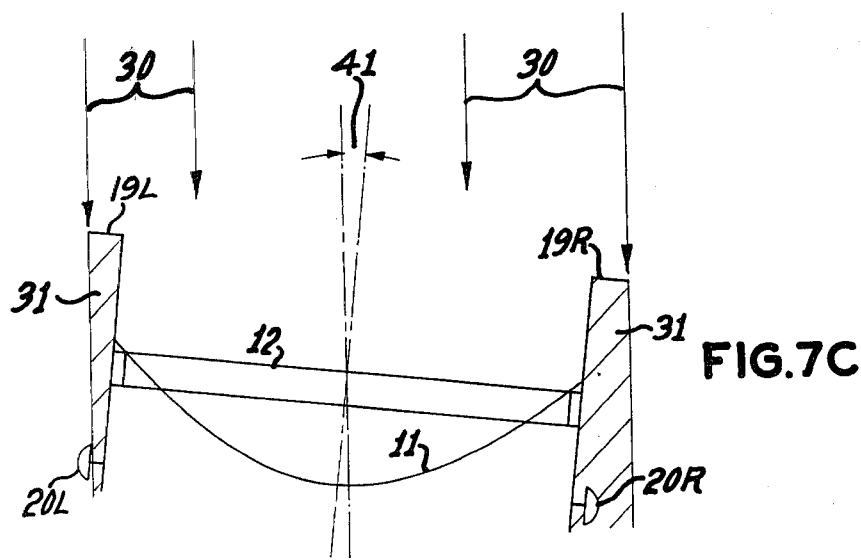

In FIGS. 7 A, B, and C there are shown schematic illustrations of how the tracking device of this operation functions to align control surface (11) with the rays from the sun (30). In FIG. 7 A there is shown control surface (11) and housing (12) to which are joined sun shades (19) and sensors (20) on each side of the control surface. When the control surface (11) is positioned as shown in FIG. 7A directly perpendicular to the sun's rays (30) sun shades (19) are able to keep sensors (20) partially and equally shaded as shown in cross hatched areas (31). In this mode the fluid in sensors (20) is at the same temperature, and thereby at the same vapor pressure, which produces a balanced pressure on the two pistons to which the sensors are connected as described previously with respect to FIG. 6, and no movement of surface (11) is produced.

In FIG. 7 B the rays of the sun (30) are not perpendicular to control surface (11) as indicated by angle (41). In this mode the sensor (20R) is not shaded from radiation by sun shade (19R) while sensor (20L) is shaded by sun shade (19L). In this situation the fluid in sensor (20R) becomes heated by radiation from the sun while the fluid in left hand sensor (20L) is not subjected to that heating. Accordingly the vapor pressure rises in right hand sensor (20R) and an unbalanced pressure is produced in the pneumatic cylinders connected to both sensors (20) which produces a movement of the rack gear which joins the two pistons in those cylinders and that movement is translated into a rotation of control surface (11) and its associated equipment to where it is then aligned with the solar radiation (30) as shown in FIG. 7 A.

In FIG. 7 C there is shown exactly the opposite condition to that just described with respect to FIG. 7 B. The same operations in reverse will function to bring the apparatus back into alignment with the sun's rays. In this instance sensor (20L) is heated producing an excess of pressure over that produced by sensor (20R) and a corresponding movement of the gears returns control surface (11) to the position shown in FIG. 7 A.

In FIGS. 8 and 9 there are illustrated the details of radiation sensors (20) from the previous description. A suitable number of supporting arm (21) are attached to housing (12) by any convenient means to support sensor (20) as shown in FIG. 4. Bracket (32) is adjustably attached to arm (21), for example by wing nut clamp (33) in order to permit adjustment up or down arm (21). Bracket (32) serves to support the three components of the sensor; namely, tubing (34), fin (35), and reservoir (36). As seen in FIG. 9 these three components of the sensor form a loop in the tubing (34) including reservoir (36) in that loop. Fin (35) is a heat conductive material, preferably a metal, which serves to enhance the ability of tubing (34) to absorb radiation from the sun and to cool when tubing (34) is in the shade. Reservoir (36) serves the purpose of maintaining a large volume of liquid inside of tubing (34) and is positioned to maintain the entire loop substantially full of liquid. Tubing (26) leads directly to pneumatic cylinders (22) as described previously. Surrounding the entire loop of tubing (34), fin (35), and reservoir (36) is an enclosure which serves as a windshield. In order to maintain the highest precision of the apparatus of this invention the windshield should not be in contact with any of the three components just mentioned and thus should be supported by brackets (32). The windshield is made of two parts, the portion (37) facing away from control surface (11) being completely transparent to solar radiation and the portion (38) facing toward control surface (11) being opaque to solar radiation. There are many suitable plastic and/or glass materials which will serve the purpose of being transparent to radiation and will serve conveniently for portion (37). Portion (38) is made of any convenient, lightweight, material such as aluminum, wood, etc. Inside surface (39) of portion (38) is made to be reflective so that any radiation reaching that surface will be reflected in a normal manner. Outside surface (40) is made to be opaque to solar radiation, and preferably not reflective to any great degree, nor should it absorb any great amount of heat. Tubing (34) and fin (35) are preferably painted with a flat black paint in order to absorb as much heat as possible. Reservoir (36) is made of such a size and placed so that it will be shaded from radiation approaching from above by fin (35) and thereby its large volume of liquid will not undergo the same extremes of temperature that will be experienced in tubing (34). The reason for having portion (38) with two different types of surface is that, in some extreme positions of the apparatus of this invention, it is conceivable that the solar radiation would be almost parallel to fin (35) and the responsiveness of the sensor would be reduced. By making surface (39) reflective and setting it at an angle to fin (35) the radiation will be reflected to the underneath side of fin (35) which will thereby be capable of absorbing sufficient heat to provide the necessary responsiveness for this sensor. Similarly outside surface (40) should be opaque to radiation because, in certain extreme positions of the apparatus of this invention, the radiation might pass underneath control surface (11) and strike the temperature sensitive elements when that is not desirable.

The principal purpose of the enclosure comprising portions (37) and (38) is to function as a shield against wind and breezes which might cause cooling by convection of the elements of the sensor and thereby disrupt its proper functioning. Although it is feasible to encapsulate these elements completely with a windshield of large volume, it is preferable to employ a small volume with the two ends (39) open to the atmosphere to facilitate cooling of the sensor elements when they have been moved into position where they are partially shaded. While it us conceivable that wind might be blowing in the direction longitudinal to the windshield and thus blow through the length of the enclosure, this same effect will apply to both sensors and thus will substantially balance each other.

Tubing (34), fin (35), reservoir (36), and bracket (32) are shown as being welded or soldered to each other to form the necessary connections. However, any suitable mechanical means of connection may be utilized. It is necessary that tubing (34) and (35) be joined in some manner which will provide maximum heat conduction in order to transmit whatever heating or cooling effects that are received by fin (35) immediately and completely to the fluid in tubing (34).

It is also important that reservoir (36) be placed in the tubing loop at the end which will be at the highest elevation, that is near the head of the machine. The reason is that this will insure that substantially all of the tubing loop will be filled with liquid contained in the reservoir. This will maximize the amount of liquid in tubing (34) that is attached to fin (35) and subjected to solar radiation, which in turn provides the best responsiveness of the sensor to the presence or absence of radiation.

The device of this invention is capable of maintaining the control surface within 0.5° of alignment with the sun's rays under normal clear sky radiation conditions. Furthermore, it is entirely capable of quickly responding to accomplish adjustment from its most westward position at sundown to the most eastward position at dawn the next day when irradiated by the sun. If the device (for example in FIG. 2) is rotated to the extreme westward position, the morning sun at the next dawn will contact the east sensor (20) but will only contact the opaque surface (40 in FIG. 8) of the west sensor (20). In this situation, which is a more extreme version of that shown in FIG. 7 B, radiation will cause heating of the sensor and the liquid contained in the sensor on the east side of the apparatus, but not the elements and the liquid in the sensor on the west side of the apparatus. This will cause an imbalance in vapor pressures forcing pistons in pneumatic cylinders toward the west, which because of the gearing arrangements tilts the control surface to the east until the east sensor is partially shaded and the control surface is aligned with the solar radiation as shown in FIG. 7 A.

Because of the difficulties of maintaining appropriate lubrication, it has been found that the cylinders (22) and pistons (29) of the rolling diaphragm type, rather than those in which piston rings are employed to seal against leakage, perform heat, however any arrangement which incorporates positive vapor seal and low friction characteristics may be employed. In cylinders having the rolling diaphragm arrangement there is no sliding frictional contact during the movement of the piston. The diaphragm in modern devices is entirely capable of functioning, under the pressures normally experienced in this tracking device for long periods of time.

Fluids employed in this device for producing the necessary vapor pressure are preferably those which can provide a vapor pressure of at least 5 psig at the minimum design temperature setting and provide increasing pressure up through a maximum design temperature setting, the pressure at the upper temperature limit being not more than about 200 psig. The increase in pressure over this range of temperatures should be reasonably constant so that no particular temperature level provides any peculiarities in pressure changes. The fluid should of course be compatible with the materials employed in the cylinders and in the sensor, and also be nontoxic, nonexplosive, and readily available. In general, there are many refrigerants which satisfy these conditions and they may be chosen from American Society of Heating Refrigerating, and Air Conditioning Engineers Handbook, however, any fluid which possesses the aforementioned characteristics may be utilized.

While the invention has been described with respect to certain specific embodiments, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what is desired to secure by Letters Patent of the United States is:

1. In a solar powered solar tracking device including a solar radiation receiving surface, a power translation means for rotating said surface about an axis to follow the source of said solar radiation in response to variations in vapor pressure of a fluid in a solar radiation sensor; the improvement in which said solar radiation sensor comprises a light weight, rapidly heat conductive tube in the form of an elongated closed loop with a heat conductive fin attached lengthwise thereto, a large volume reservoir forming part of said loop and being located adjacent the end of said loop which is at the highest elevation, said tube and said reservoir being partially filled with a vaporizable liquid, said fin being positioned to shield said reservoir from said solar radiation, said loop, said fin, and said reservoir being enclosed by a tubular wind screen.

2. The device of claim 1 wherein said vaporizable liquid has a vapor pressure temperature relationship which exhibits a pressure of at least 5 psig. at a temperature of about 20° F. and a pressure of not more than about 200 psig. at a temperature of about 125° F.

3. The device of claim 1 wherein the sensor, the fin, and the reservoir are made of metal.

4. The device of claim 1 including at least two separate sensors and a shading device for each sensor.

5. The device of claim 4 wherein the size of the sensor and its fin and the size and placement of the shading devices are such that the maximum deviation of the device in tracking the sun is ±0.5 degrees under normal clear sky radiation conditions.

6. The device of claim 1 in which the tracking device includes a parabolic mirror and a solar energy receiver.

7. The device of claim 1 in which the sensor tube and the reservoir are operatively connected in a closed loop.

8. The device of claim 1 in which the wind shield is open to the atmosphere at each end.

9. The device of claim 1 in which said sensor, fin, reservoir, and windshield are substantially coextensive with surface of the device receiving solar radiation and parallel to the axis of rotation of that surface, said wind shield being opaque to solar radiation over the portion of its surface facing said tracking device and is transparent to solar radiation over the portion of its surface facing away from said tracking device.

10. A heat radiation sensing element comprising a closed loop of metal tubing partially filled with a vaporizable liquid and an outlet in the tubing connected to a vapor pressure-sensitive device, the loop including a large volume reservoir for said liquid, an elongated metal fin heat-conductively attached lengthwise to a length of the tubing in the loop with said length of tubing being located on the side of said fin facing the source of heat radiation being sensed and said reservoir being located on the opposite side of said fin shielded from said radiation.

11. A solar powered tracking device for receiving solar energy comprising a mirror with a parabolic cross section and tubular energy receiver positioned along the axis of the parabolic mirror, a radiation sensor fixed to each side of said mirror including a tubular loop partially filled with a vaporizable liquid with a heat conductive fin attached to said loop and a large volume reservoir included in said loop, a wind shield substantially enclosing said sensor loop, fin, and reservoir, shading means fixed to said mirror to shade said sensor from solar radiation when said mirror is within 0.5° of tracking the sun, and pneumatic cylinder means operatively connected to said sensors to receive and respond to vapor pressure of the liquid in said sensors and operatively connected to said mirror to rotate it about its axis in response to said vapor pressure.

12. The tracking device of claim 11 wherein the wind shield is transparent to solar radiation over the portion of its surface facing away from said device and opaque to solar radiation over the portion of its surface facing toward said device, the interior surface of said opaque portion being reflective.

* * * * *

UNITED STATES PATENT AND TRADEMARK OFFICE
Certificate

Patent No. 4,306,541                              Patented Dec. 22, 1981

Clayton Morrison and Norman Cope

Application having been made by Clayton Morrison and Norman Cope, the inventors named in the patent above identified, and University of Florida, the assignee, for the issuance of a certificate under the provisions of Title 35, Section 256, of the United States Code, adding the name of Erich A. Farber as a joint inventor, and a showing and proof of facts satisfying the requirements of the said section having been submitted, it is this 8th day of May, 1984, certified that the name of the said Erich A. Farber is hereby added to the said patent as a joint inventor with the said Clayton Morrison and Norman Cope.

Fred W. Sherling,
*Associate Solicitor.*